United States Patent
Kawasaki et al.

(10) Patent No.: US 8,928,818 B2
(45) Date of Patent: Jan. 6, 2015

(54) ELECTRONIC DEVICE, DISPLAY METHOD, AND STORAGE MEDIUM

(71) Applicant: Kabushiki Kaisha Toshiba, Tokyo (JP)

(72) Inventors: Hirokazu Kawasaki, Fussa (JP); Toshikazu Mukaiyama, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/054,630

(22) Filed: Oct. 15, 2013

(65) Prior Publication Data
US 2014/0320749 A1    Oct. 30, 2014

(30) Foreign Application Priority Data
Apr. 24, 2013   (JP) .................................. 2013-091609

(51) Int. Cl.
*H04N 5/63*   (2006.01)

(52) U.S. Cl.
CPC ...................................... *H04N 5/63* (2013.01)
USPC ......................................... 348/730; 348/725

(58) Field of Classification Search
CPC ......... H04N 5/4401; H04N 5/44; H04N 5/63; H04N 3/185; H04N 3/18; H04N 21/4436; G06F 1/3203; H02M 2001/0032; Y02B 70/16
USPC .......... 348/730, 734, 725; 345/211, 212, 169; 713/320, 323, 324, 340
IPC ................................................. H04N 5/63, 5/44
See application file for complete search history.

(56) References Cited

U.S. PATENT DOCUMENTS

| | | | |
|---|---|---|---|
| 6,285,406 B1 * | 9/2001 | Brusky ........................... | 348/730 |
| 6,392,716 B1 * | 5/2002 | Nagata et al. .................. | 348/730 |
| 6,670,997 B1 * | 12/2003 | Nortrup ........................ | 348/730 |
| 6,876,400 B2 * | 4/2005 | Schnellenberger ........... | 348/725 |
| 7,411,631 B1 * | 8/2008 | Joshi et al. .................... | 348/730 |
| 8,553,157 B2 * | 10/2013 | Waites et al. .................. | 348/730 |
| 2012/0167139 A1 | 6/2012 | Kurosaki et al. | |

FOREIGN PATENT DOCUMENTS

JP   2007-166481   6/2007
JP   2012-138749   7/2012

* cited by examiner

*Primary Examiner* — Sherrie Hsia
(74) *Attorney, Agent, or Firm* — Blakely, Sokoloff, Taylor & Zafman LLP

(57) ABSTRACT

According to one embodiment, an electronic device is connectable to a display and includes a television receiver configured to receive television broadcasting and to output a video signal. The electronic device starts up at least a part of the television receiver when the electronic device is connected to a commercial power source. The electronic device starts to output the video signal from the television receiver to the display when it is detected that a power switch is turned on.

19 Claims, 7 Drawing Sheets

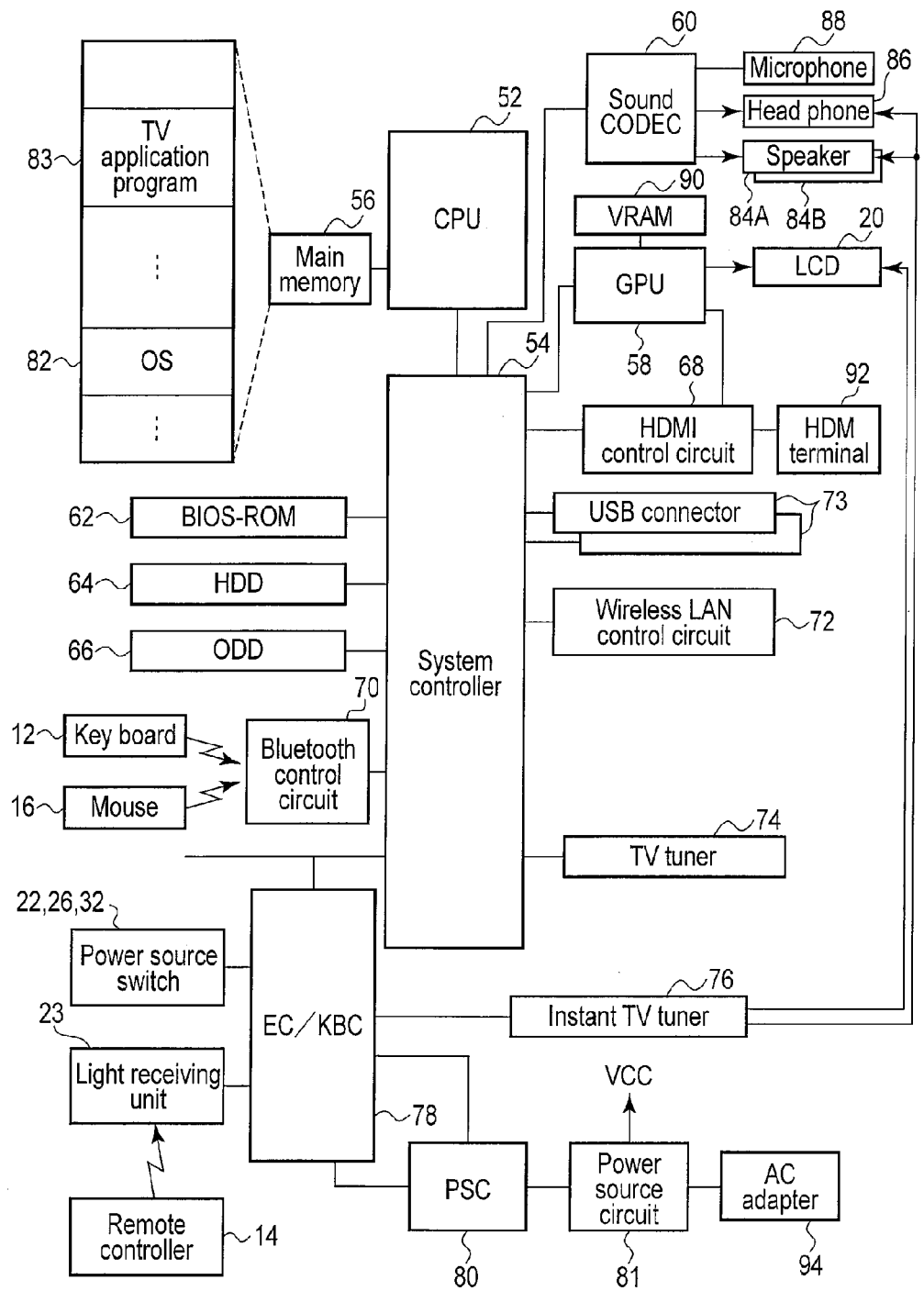
F I G. 3

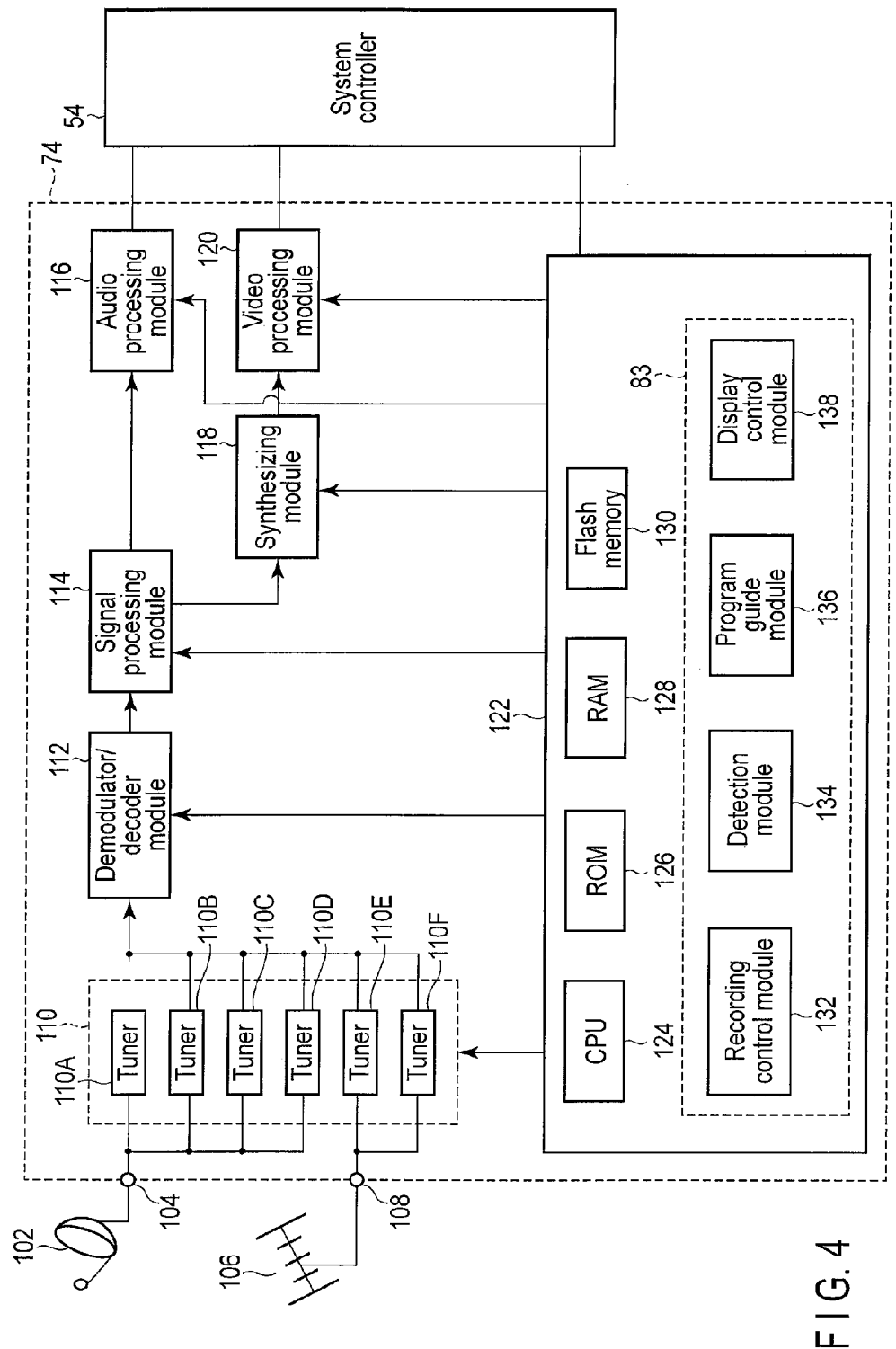
F I G. 4

ELECTRONIC DEVICE, DISPLAY METHOD, AND STORAGE MEDIUM

CROSS-REFERENCE TO RELATED APPLICATIONS

This application is based upon and claims the benefit of priority from Japanese Patent Application No. 2013-091609, filed Apr. 24, 2013, the entire contents of which are incorporated herein by reference.

FIELD

Embodiments described herein relate generally to electronic device for displaying TV broadcasting, a display method, and a storage medium.

BACKGROUND

Conventionally, electronic device such as a personal computer (PC), and the like incorporates a function (TV function) for watching TV broadcast. The electronic device incorporates a TV tuner and is installed with an application (TV application) for watching TV broadcasting. The TV application is operated under the control of an OS (Operating System), causes an image received by a TV tuner to be displayed on a display, and causes an audio to be output from a speaker, and the like.

As described above, to watch TV broadcasting, since it is necessary for electronic device such as a PC and the like on which a TV function is mounted to start the OS, the startup time of the electronic device from a time a power source is turned on to a time an image begins to be displayed on a display is longer than that of a TV receiver.

In conventional electronic device incorporating a TV function, since a startup time is necessary until a TV image is displayed on a display after a power source has been turned on, TV broadcasting cannot be watched at once after the power source has been turned on.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a view showing an example of a system configuration of a PC according to the embodiment.

FIG. 4 is a view showing an example of a system configuration of a TV tuner 74 according to the embodiment.

DETAILED DESCRIPTION

Various embodiments will be described hereinafter with reference to the accompanying drawings.

In general, according to one embodiment, an electronic device is connectable to a display and includes a television receiver configured to receive television broadcasting and to output a video signal. The electronic device starts up at least a part of the television receiver when the electronic device is connected to a commercial power source. The electronic device starts to output the video signal from the television receiver to the display when it is detected that a power switch is turned on.

Figure 1:
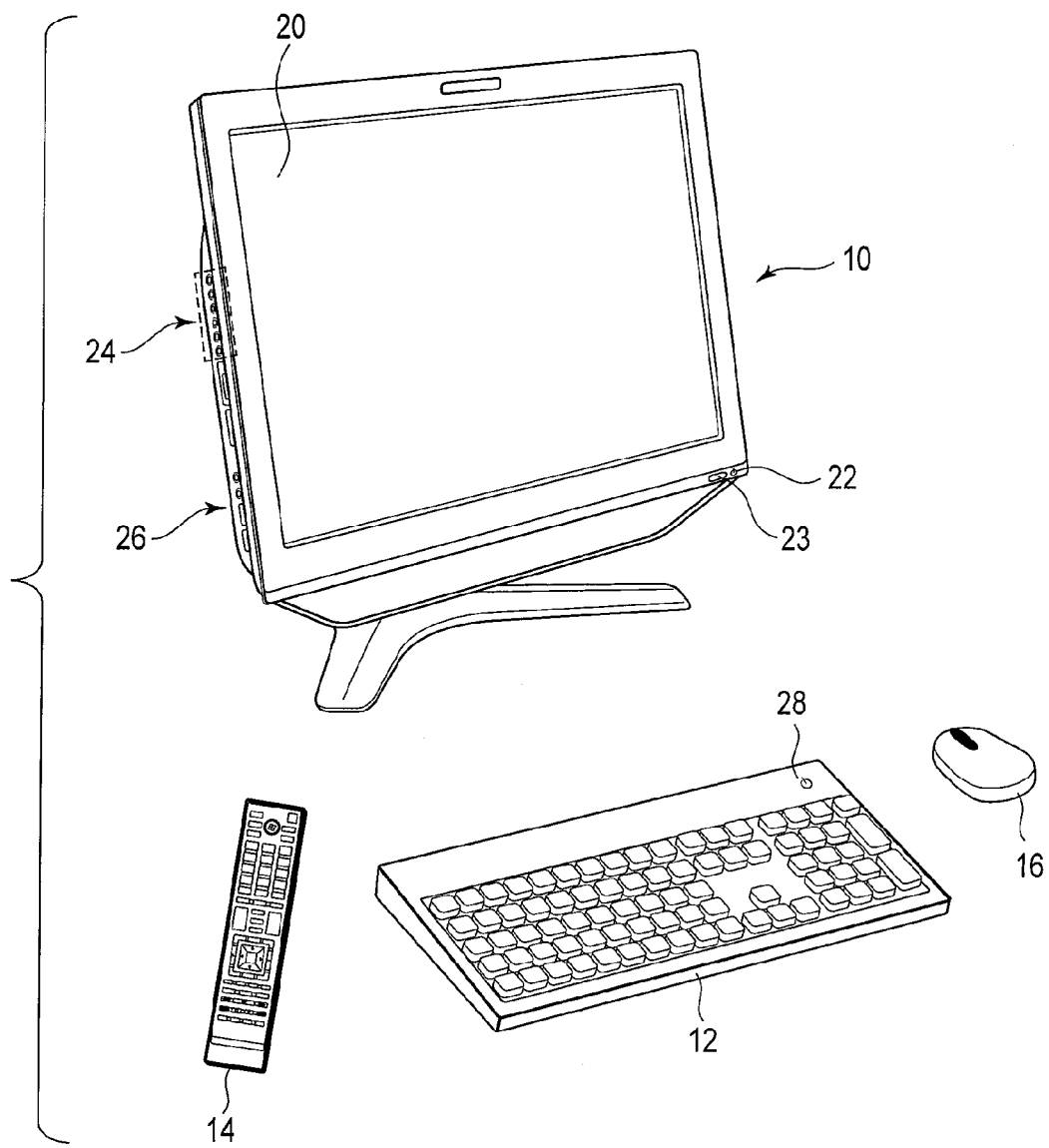
FIG. 1 is a view showing an example of an external appearance configuration of electronic device of an embodiment.

FIG. 1 is a view showing an external appearance configuration of electronic device according to an embodiment. The electronic device can be realized as, for example, a notebook type PC, a desktop type PC, a tablet terminal, or other various electronic device operated under the control of an OS. In the following explanation, the electronic device is realized as a desktop type PC.

For the convenience of explanation, although FIG. 1 shows the desktop type PC as a built-in type PC in which a PC main body is assembled in a housing of a display, the desktop type PC can be also realized as a desktop type PC in which a PC main body is configured as a body independent of a display. The electronic device is mainly composed of a display main body 10, a key board 12, a remote controller 14, and a mouse 16. The display main body 10 is connected to a commercial power source via an AC adaptor connected to a power source connector disposed on its back surface and a power cord. In an example of FIG. 1, each of the key board 12, the remote controller 14, and the mouse 16 has a battery built therein and is driven by the battery. The display main body 10 is wirelessly connected to the key board 12 and the mouse 16 by Bluetooth (Registered trademark). However, the key board 12 and the mouse 16 may be connected to the display main body 10 via a cable.

The display main body 10 has an LCD (liquid crystal) panel 20 disposed on a front surface, and a power source button 22 and a light receiving unit 23 are disposed to a right lower portion of the front surface. The power source button 22 turns on and off a power source of the PC. The light receiving unit 23 receives an RF remote control signal from the remote controller 14. A speaker is disposed to a lower portion of the display main body 10. Various operation buttons 24 and terminals 26 are disposed on a left side surface of the display main body 10. The operation buttons 24 include, for example, a screen off button, an input switch button, a sound volume button, and the like. When screen off button is pressed, a PC function or a TV function continues an execution state as it is and only a display on a screen is stopped. When the screen off button is pressed again in the state, the display on the screen is resumed. The terminals 26 include, for example, a headphone output terminal, a microphone input terminal, a media slot, a USB connector, and the like. An optical disc drive (ODD) such as a DVD, a BD, and the like is built in on a right side surface of the display main body 10. A wireless LAN antenna and a Bluetooth (Registered Trademark) antenna are built in to an upper portion of the display main body 10. Various terminals are disposed to a back surface of the display main body 10. The various terminals include, for example, a USB connector, an HDMI (High-Definition Multimedia Interface) (Registered Trademark) input terminal, an antenna input terminal, a LAN connector, and the like in addition to the power source connector described above. For example, the USB connector is connected with a USB hard disk, the HDMI input terminal is input with an image signal from an external image device such as a game machine, AV device, and the like via an HDMI cable, and the antenna input terminal is input with a broadcasting signal from a TV antenna.

The key board 12 is also provided with a power source button 28. When the power source buttons 22, 28 are pressed, power is supplied, and the OS is started. Each of the power source buttons 22, 28 has a color-variable LED indicator embedded on its surface, and the states of the power sources and the display are shown by the colors of the indicator being lit. For example, the indicator which is lit white shows that a power source is turned on, the indicator lit orange shows that the power source is turned off (at the time the power source cord is connected to the AC adaptor) or is in a halt state, the indicator blinking orange shows sleep, the indicator lit blue shows that the display is turned off (at the time the power source cord is connected to the AC adaptor), the indicator lit red shows that a TV program is being recorded, and the indicator turned off shows that the power source cord is disconnected from the AC adaptor.

Figure 2:
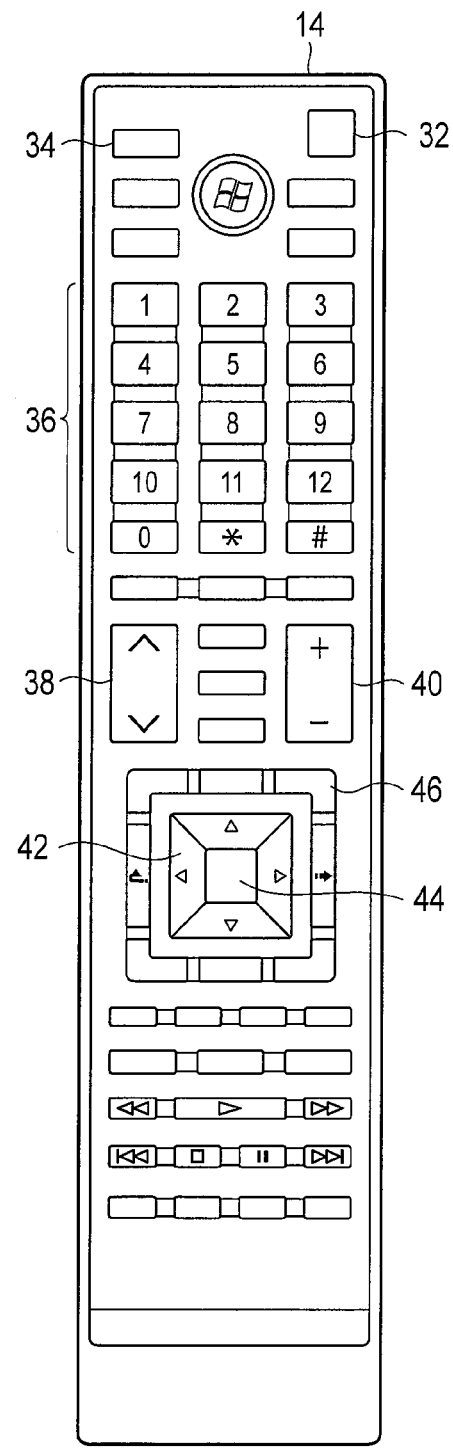
FIG. 2 is a view showing an example of a button disposed to a remote controller according to the embodiment.

The remote controller 14 is disposed for the purpose of convenience of watching TV broadcasting and provided with, for example, buttons as shown in FIG. 2. For example, the remote controller 14 includes a PC power source button 32, a TV power source button 34, a channel number button 36, a channel change button 38, a volume button 40, a direction button 42, a decision button 44, a multi button 46, and other various buttons. The PC power source button 32 functions likewise the power source buttons 22, 26, and when the PC power source button 32 is pressed, power is supplied, the OS is started up, and the electric device is operated as the PC. However, no LED indicator is embedded in a button surface of the power source of button 32. When the TV power source button 34 is pressed (it is instructed to turn on a TV power source), the TV function is turned on, and the electronic device operates as a TV receiver, and a TV broadcasting program is displayed on the LCD panel 20. In the state, when the TV power source button 34 is pressed (it is instructed to turn off the TV power source), the TV function is turned off, and the display of the TV broadcasting program on the LCD panel 20 is finished. In this way, the electronic device has the PC function and the TV function, the PC function is started up by operating the power source buttons 22, 26 and the PC power source button 32, and the TV function is started up by operating the TV power source button 34. Note that both the functions may be started up at the same time and a PC screen and a TV screen may be displayed at the same time.

The direction button 42 can be pressed at four positions, i.e. up, down, right, and left positions and a cursor can be shifted to any of the up, down, right, and left positions depending on a pressed position. A shift means a movement of a minimum unit and moves the cursor to a next button in a menu and to a next program frame of an electronic program guide, and the like. The multi button 46 can be pressed at eight positions in total, i.e., four oblique positions in addition to the up, down, right, and left positions, pressing the multi button 46 at any of the up, down, right, and left positions allows to execute a key operation equivalent to any of four key operations to "program explanation", "one touch skip", "reservation list", or "one touch replay", and when and any of the up, down, right, and left positions is pressed while the cursor is displayed, the cursor can be jumped in any of up, down, right, and left directions. Pressing the multi button 46 at any of the oblique positions allows to execute a key operation equivalent to any of four key operations to "recorded program list", "program guide", "finish", or "returns". The jump means to move the cursor in a unit larger than the shift and to switch the screen to other page, and the like. Accordingly, a cursor jump and a page switch are used in the same meaning.

FIG. 3 shows an example of a system configuration according to the embodiment of the desktop type PC. The PC mainly includes a CPU 52, a system controller 54, a main memory 56, a graphic processing unit (GPU) 58, a sound codec 60, a BIOS-ROM 62, a hard disk drive (HDD) 64, an optical disc drive (ODD) 66, an HDMI control circuit 68, a Bluetooth (Registered Trademark) control circuit 70, a wireless LAN control circuit 72, a USB connector 73, a TV tuner 74, an instant TV tuner 76, an embedded controller/key board controller IC (EC/KBC) 78, a power source controller (PSC) 80, a power source circuit 81, and the like.

The CPU 52 is a processor for controlling the operation of the respective components of the PC. The CPU 52 executes various programs loaded from the HDD 64 to the main memory 56. The various programs include an operating system (OS) 82 and various application programs. The various application programs include, for example, a TV application program 83. The TV application program 83 is a program for watching TV broadcasting (contents) received by the TV tuner 74, displays a video of a TV program on the display (LCD panel 20), and outputs an audio from speakers 84A, 84B or a headphone 86 via the sound codec 60. The TV application program 83 presents a function for displaying a program guide based on program data (EGP) (Electronic program Guide data) and also a function for displaying various set screens as to TV watching and receiving an operation by a user, and the like. The sound codec 60 is also connected with a microphone 88.

The TV tuner 74 is connected to the system controller 54 and is equivalent to a conventional TV tuner built in a PC. The TV tuner 74 does not work unless the OS 82 starts up. The function of the TV tuner 74 is realized by the TV application program 83. The embodiment further includes the instant TV tuner 76 connected to the EC/KBC 78. Since function of the instant TV tuner 76 is realized by hardware, it can be operated before the OS is started up. Starting up the instant TV tuner 76 before the TV power source button 34 is pressed can reduce a time until a video is displayed after the TV power source button 34 has been pressed.

Note that although the TV tuner 74 and the instant TV tuner 76 may have the same function, they need not have the same function. Since the instant TV tuner 76 starts up the TV at a speed as higher as possible without increasing standby consumption power as far as possible, the function of the instant TV tuner 76 may be smaller than that of the TV tuner 74. For example, according to the embodiment, the TV tuner 74 is provided with each two sets of TV tuners corresponding to terrestrial digital broadcasting, BS digital broadcasting, and 110-degree CS digital broadcasting, and also with a program recording function and an EPG display function. However, the instant TV tuner 76 is provided with only a TV tuner corresponding to the terrestrial digital broadcasting. Further, the instant TV tuner 76 is not provided with the program recording function and the EPG display function.

The CPU 52 executes also a basic input/output system (BIOS) stored in the BIOS-ROM 62 which is a non-volatile memory. The BIOS is a system program for controlling hardware. The BIOS executes a control according to an event generated by a button operation of the remote controller 14.

The GPU 58 is a display controller for controlling the LCD panel 20 used as a display monitor of the PC. The GPU 58 creates a display signal (for example, LVDS (Low Voltage Differential Signaling) signal) to be supplied from the display data stored a video memory (VRAM) 90 to the LCD panel 20. An HDMI input terminal 92 is connected to the HDMI control circuit 68 and can be input with an HDMI video signal (non-compression digital video signal) and a digital audio signal from external device via a cable.

The system controller 54 is a bridge device for connecting between the CPU 52 and the respective components. The system controller 54 is built-in with a serial ATA controller for controlling the hard disk drive (HDD) 64 and the optical disc drive (ODD) 66.

Further, the system controller 54 is connected with devices such as the Bluetooth (Registered Trademark) control circuit 70, the USB connector 73, the wireless LAN control circuit 72, the TV tuner 74, and the like. The Bluetooth (Registered Trademark) control circuit 70 receives a wireless signal from the key board 12 and the mouse 16.

The TV tuner 74 is connected with a TV broadcast receiving antenna. The TV tuner 74 receives a TV broadcasting wave via an antenna and outputs a TV broadcasting signal.

Further, the system controller 54 communicates with respective devices connected thereto via a bus.

The EC/KBC 78 is connected to the system controller 54 via a bus. Further, the EC/KBC 78 is mutually connected to the power source controller (PSC) 80 and the power source circuit 81 via a serial bus.

The EC/KBC 78 is connected also with the instant TV tuner 76. An output (LVDS signal) of the instant TV tuner 76 is supplied to the LCD panel 20, the speakers 84A, 84B, and the headphone 86.

The EC/KBC 78 is connected with the light receiving unit 23 for receiving the RF signal output from the remote controller 14.

The EC/KBC 78 is a power management controller for managing the power of the PC. The EC/KBC 78 has a function for turning on and off of the power of the PC according to the operation of the power source switches 22, 26, 32 operated by the user. The power-on and power-off control of the PC is executed by a cooperative operation of the EC/KBC 78 and the power source controller (PSC) 80.

On receiving an on-signal transmitted from the EC/KBC 78, the power source controller (PSC) 80 turns on the power of the PC by controlling the power source circuit 81. Further, on receiving an off signal transmitted from the EC/KBC 78, the power source controller (PSC) 80 turns off the power of the PC by controlling the power source circuit 81.

The power source circuit 81 creates power (operation power source) to be supplied to the respective components using the power from an AC adaptor 94.

FIG. 4 shows an example of a configuration of the TV tuner 74. As described above, the TV tuner 74 has TV tuners 110A, 110B corresponding to the BS digital broadcasting, TV tuners 110C, 110D corresponding to the 110-degree CS digital broadcasting, and TV tuners 110E, 110F corresponding to the terrestrial digital broadcasting. A satellite digital broadcasting signal received by a BS/CS digital broadcast receiving antenna 102 is supplied to the satellite digital broadcast TV tuners 110A, 110B, 110C, 110D via an input terminal 104, thereby a broadcasting signal of a desired channel is tuned. A terrestrial digital broadcasting signal received by a terrestrial digital broadcasting antenna 106 is supplied to the terrestrial digital broadcasting TV tuners 110E, 110F via an input terminal 108, thereby a broadcasting signal of a desired channel is tuned. Since the respective broadcasting signals can be tuned by the two tuners, two programs in the same time zone can be simultaneously recorded.

After a broadcasting signal tuned by a tuner unit 110 has been supplied to a demodulator/decoder module 112 and demodulated to a digital video signal, an audio signal, and the like, the broadcasting signal is output to a signal processing module 114. The signal processing module 114 applies predetermined digital signal processing to the digital video signal and the audio signal supplied from the demodulator/decoder module 112, respectively.

The signal processing module 114 outputs the digital video signal to a synthesizing module 118 and outputs the digital audio signal to an audio processing module 116. The synthesizing module 118 superimposes an OSD (on screen display) signal on the digital video signal supplied from the signal processing module 114 and outputs the superimposed digital video signal to a video processing module 120.

The video processing module 120 converts the digital video signal input thereto to a format that can be displayed by a display unit (LCD panel 20) on a latter part. The video processing module 120 executes various image quality enhancement processes including a super-resolution process and a motion picture improving process. The video signal output from the video processing module 120 is supplied to the system controller 54 and an image is displayed.

The audio processing module 116 converts the digital audio signal input thereto to an audio signal of a format which can be played back by the speakers 84A, 84B on a latter part. The audio signal output from the audio processing module 116 is supplied to the system controller 54 and an audio is played back.

In the TV tuner 74, all the operations including the various receiving operations and tuning operations are integrally controlled by a tuner controller 122. The tuner controller 122 is controlled by the system controller 54. The tuner controller 122 includes a built-in CPU (central processing unit) 124 and receives an operation signal from an operation button disposed to the display main body 10 or receives an operation signal sent from the remote controller 14 and received by the light receiving unit 23 to thereby control the respective components so that the operation contents of thereof can be reflected, respectively.

The tuner controller 122 makes use of a memory when the respective components are controlled. The memory mainly includes a ROM (read only memory) 126 in which a control program executed by the CPU 124 is stored, a RAM (random access memory) 128 for providing a work area with the CPU 124, and a flash memory 130 in which various set information, control information, and the like are stored. The flash memory 130 also stores data for displaying, for example, program information, reserved program information being registered, and various menus.

The tuner controller 122 includes a program recording control module 132. The program recording control module 132 controls a record of a program tuned by the tuner unit 110. Contents data such as a program and the like is recorded in a predetermined recording medium. For example, the tuner controller 122 may be connected with an external HDD via the USB connector 73. Otherwise, the tuner controller 122 may be connected with an HDD recorder and the like externally connected by an interface such as an HDMI, and the like. The program recording control module 132 executes a control for recording the digital video signal and audio signal obtained from the demodulator/decoder module 112 in a recording medium based on the operation of the remote controller 14, and the like.

The program recording control module 132 writes the program reservation information input in response to the operation of the remote controller 14, and the like to the flash memory 130. When a target program begins to be broadcast, the program recording control module 132 executes a control so as to record the program based on the program reservation information being registered. Further, the program recording control module 132 executes also a control for playing back a program recorded in the recording medium.

The program recording control module 132 controls a registration for reserving to record respective programs and an execution of record of a program and recording of a program by operating the cursor on an EPG using a direction button of the remote controller 14, and the like and by executing an operation such as a decision operation, and the like by the user. An indicator showing that a recording reservation has been set is displayed to a program whose recording has been reserved. Further, a similar indicator (indicator showing that a program is being recorded) may be displayed to a program being recorded.

The tuner controller 122 includes a detection module 134. The detection module 134 detects whether or not the same program as the program having been reserved is reserved in duplication (called a duplicate reservation for recording a program) during a predetermined period before the program whose recording has been registered begins to be broadcast (before the program is actually recorded). The detection module 134 detects whether or not recording of a program has been reserved in duplication at the time of reservation operation for recording the program. The program recording control module 132 executes a control to prevent the same program from being recorded in duplication based on a result of detection of the detection module 134.

The tuner controller 122 includes a program guide module 136. The program guide module 136 creates the EPG based on electronic program guide (EPG) information included in the broadcasting waves received by the antennas 102, 106. The program information such as a channel, a program title, and the like that create the EPG is stored in the flash memory 130.

The tuner controller 122 includes a display control module 138. When the program recording control module 132 executes a control based on the control of the detection module 134 so that the same program is not recorded in duplication, the display control module 138 executes a control to display a menu for showing the above point to the user. Further, when the detection module 134 detects that it has been registered to record the same program as a program which is intended to be registered to record by the user, the display control module 138 executes a control for displaying a menu showing the user that the program has been already registered to be recorded. Further, a Graphical User Interface (GUI) such as various menus, and the like is displayed based on the control of the display control module 138.

The program recording control module 132, the detection module 134, the program guide module 136, and the display control module 138 are realized by the TV application program 83 and operate under the control of the OS 82.

Figure 5:
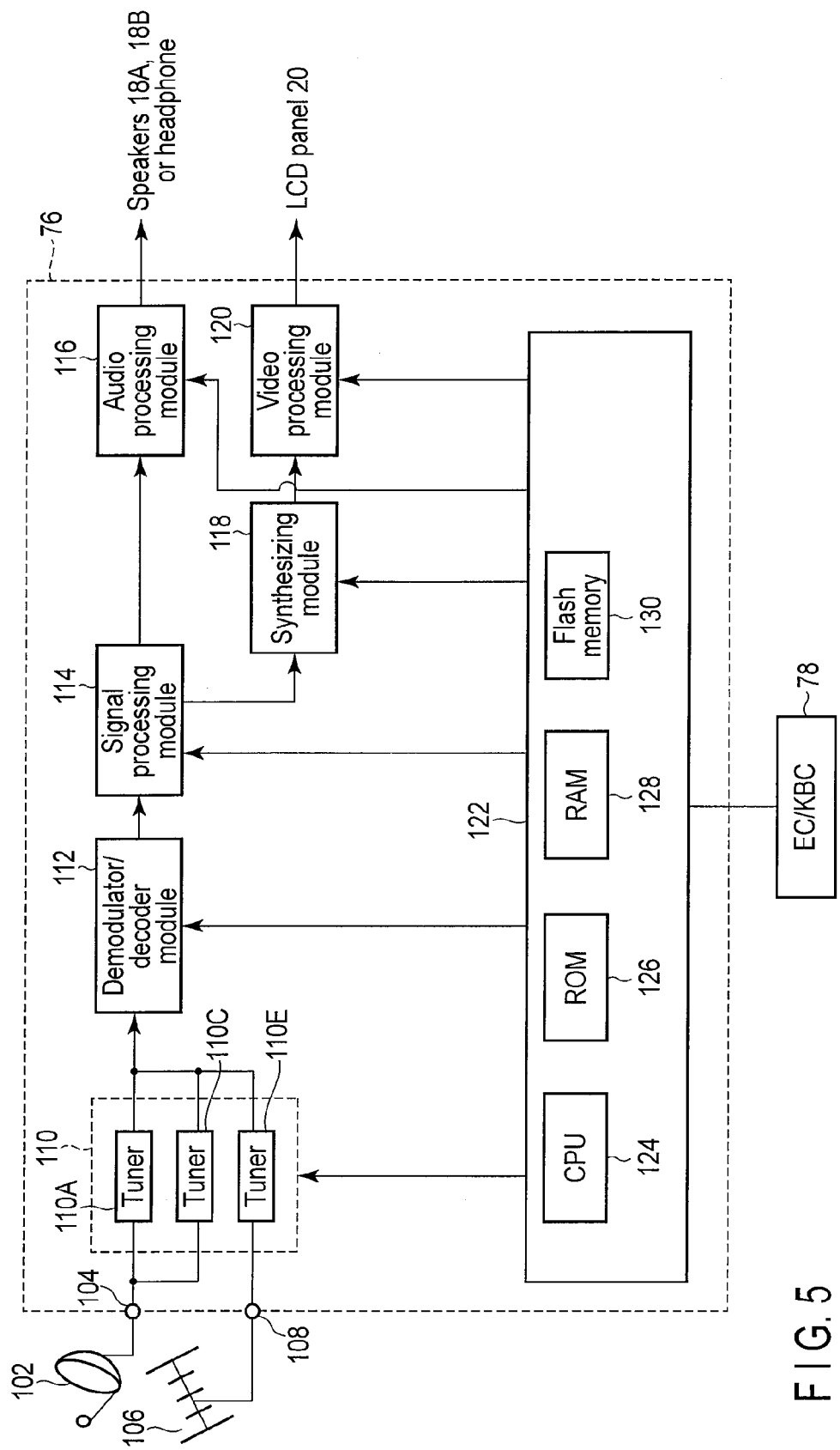
FIG. 5 is a view showing an example of a system configuration of an instant TV tuner 76 according to the embodiment.

FIG. 5 shows an example of a configuration of the instant TV tuner 76. The instant TV tuner 76 has the TV tuner 110A corresponding to the BS digital broadcasting, the TV tuner 110C corresponding to the 110-degree CS digital broadcasting, and the TV tuner 110E corresponding to the terrestrial digital broadcasting.

After a broadcasting signal tuned by the tuner 110 has been supplied to the demodulator/decoder module 112 and demodulated to the digital video signal and audio signal, and the like, the digital video signal and audio signal, and the like are output to the signal processing module 114. The signal processing module 114 applies the predetermined digital signal processing to the digital video signal and the audio signal supplied from the demodulator/decoder module 112, respectively.

The signal processing module 114 outputs the digital video signal to the synthesizing module 118 and outputs the digital audio signal to the audio processing module 116. The synthesizing module 118 superimposes the OSD (on screen display) signal on the digital video signal supplied from the signal processing module 114 and outputs the superimposed digital video signal to the video processing module 120.

The video processing module 120 converts the digital video signal input thereto to an LVDS video signal which is a format that can be displayed by the display unit (LCD panel 20) on the latter part. The video processing module 120 executes various image quality enhancement processes including a super-resolution process and a motion picture improving process. The LVDS video signal output from the video processing module 120 is supplied to the LCD panel 20 so that an image is displayed.

The audio processing module 116 converts the digital audio signal input thereto to an audio signal of a format which can be played back by the speakers 84A, 84B on the latter part. The audio signal output from the audio processing module 116 is supplied to the speakers 84A, 84B, or the headphone 86 and played back.

In the Instant TV tuner 76, all the operations including the various receiving operations and selection operations are integrally controlled by the tuner controller 122. The tuner controller 122 includes a built-in CPU (central processing unit) 124 and receives an operation signal from the operation button disposed to the display main body 10 or receives an operation signal sent from the remote controller 14 and received by the light receiving unit 23 to thereby control the respective components so that the operation contents of thereof can be reflected, respectively.

The tuner controller 122 makes use of the memory when the respective components are controlled. The memory mainly includes an OS executed by the CPU 124 and the ROM (read only memory) 126 in which the control program is stored, the RAM (random access memory) 128 for providing the work area with the CPU 124, and the flash memory 130 in which the various set information, the control information, and the like are stored. The flash memory 130 also stores the data for displaying, for example, the program information, the reserved program information being registered, and the various menus. Since the instant TV tuner 76 includes also the CPU 124, it is operated by an OS (firmware). However, since the number of modules included in the instant TV tuner 76 is smaller than that of the PC, the OS (firmware) of the instant TV tuner 76 starts up in a shorter time different from the OS 82 of the PC. Note that since the instant TV tuner 76 is not operated under the control of the OS 82 of the PC, the tuner controller 122 thereof does not include the program recording control module 132, the detection module 134, the program guide module 136, and the display control module 138 different from the control module of the TV tuner 74.

A parallel signal is transferred between the instant TV tuner 76 and the EC/KBC 78 according to a Universal Asynchronous Receiver Transmitter (UART) system, and the LDVS video signal as a serial signal is supplied from the instant TV tuner 76 to the LCD panel 20.

Figure 6:
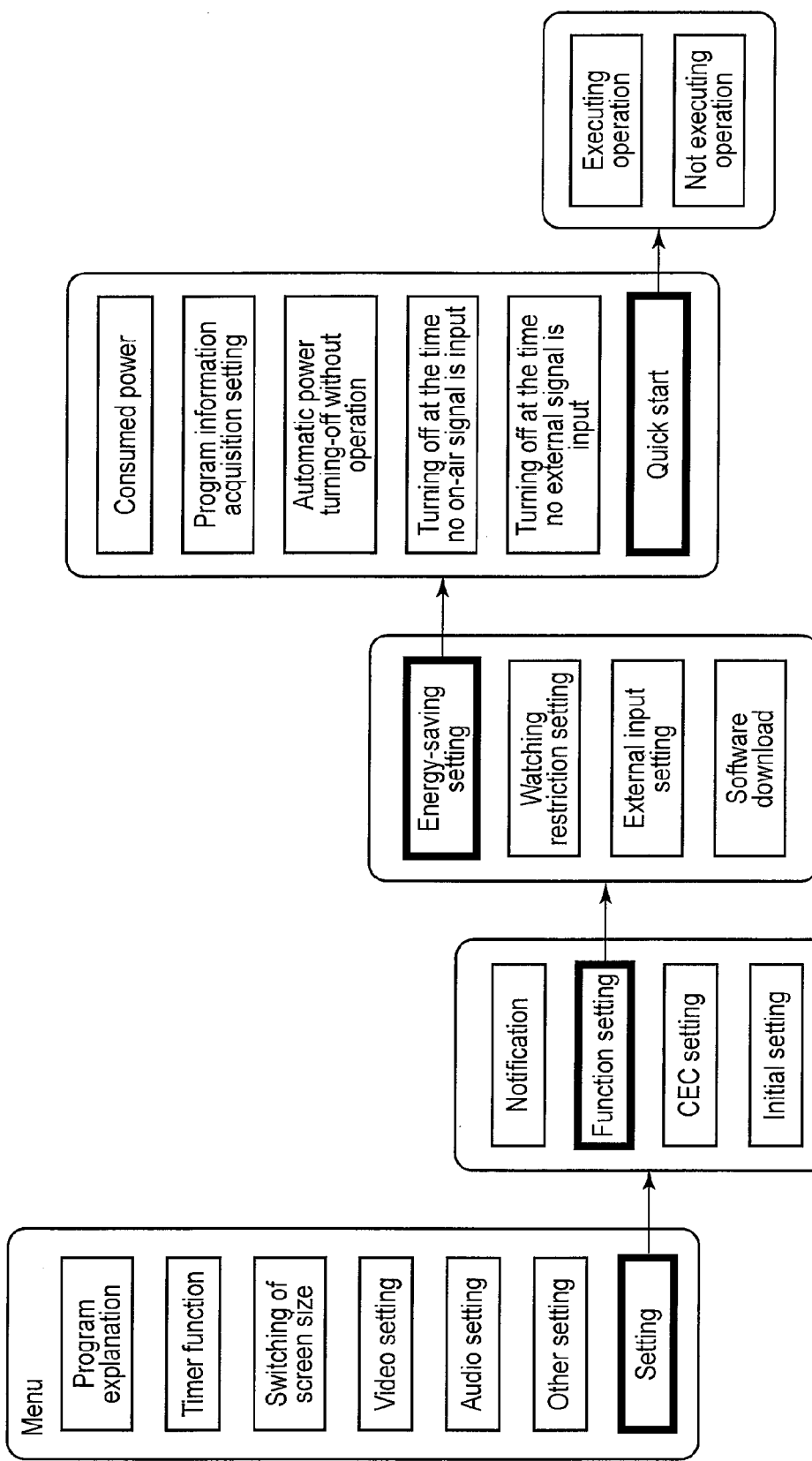
FIG. 6 is a view showing an example of menu items according to the embodiment.

Next, an operation of the electronic device will be explained. According to the embodiment, as described above, although the startup time can be reduced by starting up the instant TV tuner 76 before the TV power source button 34 is pressed, since waiting power is increased thereby, whether or not the startup time is to be reduced (quick start) can be selected by the user. As an example, FIG. 6 shows a case whether or not the quick start is operated is selected from a menu.

The menu includes a program explanation, a timer function, a switching of a screen size, a video setting, an audio setting, other setting, and setting items. When "the setting" is selected, the items of a notification, a function setting, a CEC setting, and an initial setting are displayed. When "the function setting" is selected, the items of an energy-saving setting, a watching restriction setting, an external input setting, and a software download are displayed. When "the energy saving setting" is selected, the items of a consumed power, a program information acquisition setting, automatic power turning-off without operation, turning off at the time of on-air without signal, turning off at the time no external signal is input, and a quick start is displayed. When "the quick start" is selected, the items of "executing an operation" and "not executing an operation" are displayed so that any of them can be selected.

Figure 7:
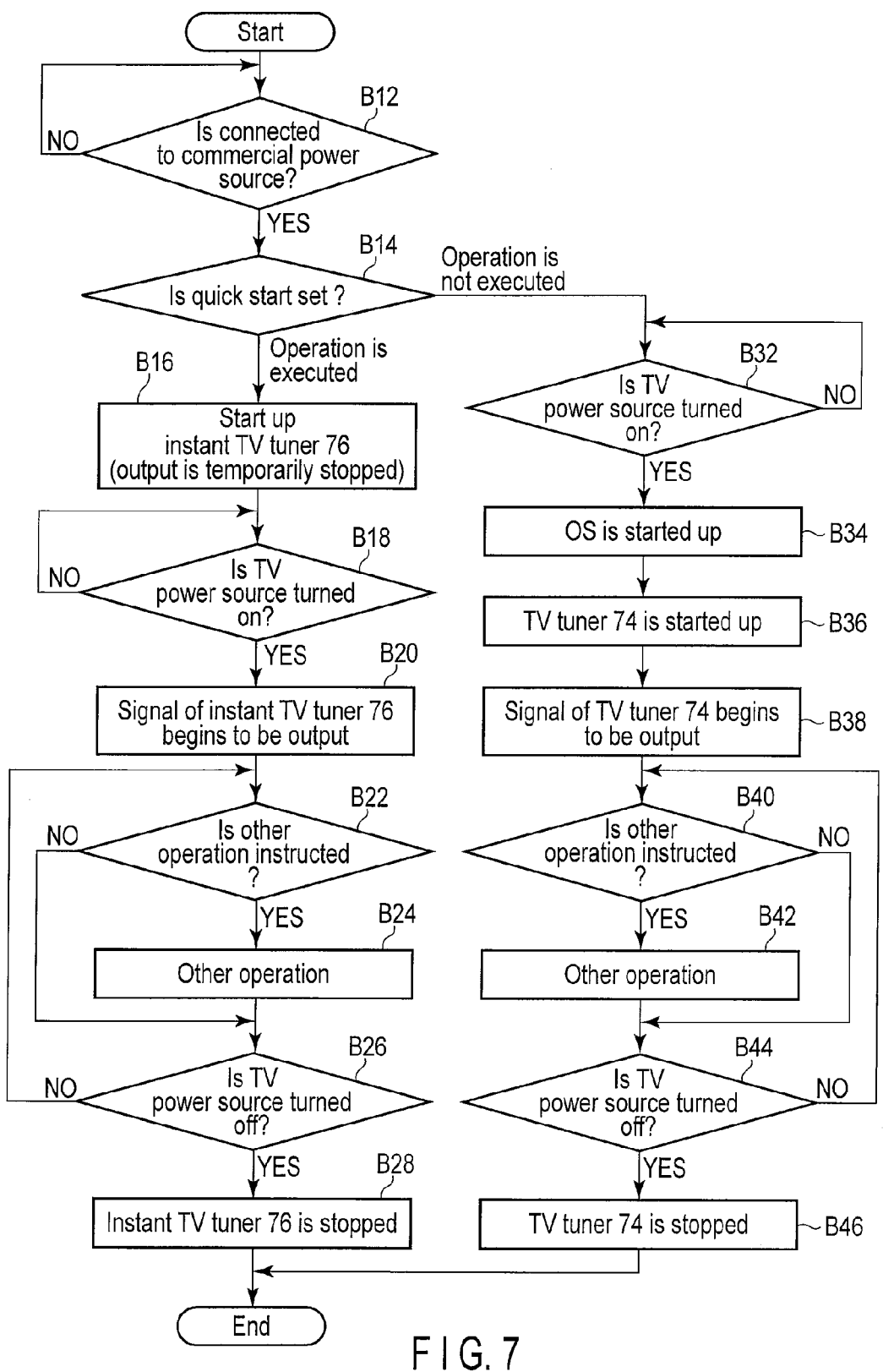
FIG. 7 is a flowchart showing an example of the operation of the embodiment.

FIG. 7 is a flowchart showing an example of the operation of the embodiment. In Block B12, it is determined whether or not the display main body 10 is connected to the commercial power source via the AC adaptor and the power source cord. When the connection to the commercial power source is detected, in Block B14, the setting of the quick start is examined. When "executing an operation" is set, OS stored in the ROM 126 is started in Block B16 regardless whether or not the TV power source button is turned on or off, and some modules of the instant TV tuner 76 are started up.

The modules started up in Block B16 include at least the demodulator/decoder module 112. When the waiting power is not restricted or equal to or less than an upper limit, any of the signal processing module 114, the audio processing module 116, the synthesizing module 118, and the video processing module 120 may be started up in addition to the demodulator/decoder module 112. It may be possible for the user to optionally select the settings for a power saving adjustment from a menu. A submenu is displayed to select modules to be started up in addition to the demodulator/decoder module 112 after "executing an operation" of the quick start of FIG. 6 has been selected. When the modules are selected, since the waiting power of the modules is known, it can be determined whether or not the modules can be started up, and thus only the modules which can be started up are started.

Further, when the upper limit of the waiting power is exceeded even if only the demodulator/decoder module 112 is started up or when it is desired to more reduce the waiting power although it is equal to or less than the upper limit, it may be possible to execute a power saving countermeasure such as a reduction of resolution of a video signal, and the like. That is, an image whose resolution is low is displayed just after the power source has been turned on, and the resolution is gradually increased. The user may also optionally select the setting from a menu.

Note that, in Block B16, the instant TV tuner 76 does not output the video signal and the audio signal to the LCD panel 20, the speakers 18A, 18B, and the like. A decoded signal is written to the RAM 128 and an output is temporarily stopped. Note that since a memory area of the RAM 128 has only a capacity for storing a few frames of video signals and audio signals, signals are sequentially overwritten.

In Block B18, whether or not the TV power source button 34 of the remote controller 14 is pressed (TV power source is turned on) is determined. When the TV power source button 34 is pressed, video/audio signals of the instant TV tuner 76 begin to be output in Block B20. Note that, in Block B16, when any of the modules of the instant TV tuner 76 is not started, the video/audio signals begin to be output after the remaining modules have been started up in Block B20. Since the some modules of the instant TV tuner 76 have been started up in Block B16, a time until a TV broadcasting program is displayed on the LCD panel 20 after the TV power source button 34 has been pressed in Block B18 is greatly reduced as compared with a conventional example in which OS is started up after the TV power source button 34 has been pressed and then a TV tuner is started up.

While the TV broadcasting is watched, in Block B22, whether or not other operation is instructed is determined. The other operation includes, for example, a program guide display operation, a program recording operation, a playback operation, a PC power source button operation, and the like. When the other operation is instructed, the other is executed in Block B24, and, thereafter, in Block B26, whether or not the TV power source button 34 of the remote controller 14 is pressed (TV power source is turned off) is determined. Also when the other operation is not instructed in Block B22, the operation in Block B24 is skipped and the operation in Block B26 is executed.

When the TV power source button 34 is pressed, the operation of the instant TV tuner 76 is stopped in Block B28.

In Block B14, when it is determined that the quick start "does not operate", whether or not the TV power source button 34 of the remote controller 14 is pressed (TV power source is turned on) is determined in Block B32. When the TV power source button 34 has been pressed, the TV tuner 74 and the TV application program 83 are started up in Block B36 after OS has been started up in Block B34. Thereafter, in Block B38, a video/audio signal of the TV tuner 74 begins to be output.

While the TV broadcasting is watched, whether or not other operation is instructed is determined in Block B40. The other operation includes, for example, the program guide display operation, the program recording operation, the playback operation, the PC power source button operation, and the like. When the other operation is instructed, the other is executed in Block B42, and thereafter whether or not the TV power source button 34 of the remote controller 14 is pressed (TV power source is turned off) is determined in Block B44. Also when the other operation is not instructed in Block B40, an operation in Block B42 is skipped and an operation in Block B44 is executed.

When the TV power source button 34 is pressed, the operation of the TV tuner 74 is stopped in Block B46.

As described above, according to the first embodiment, the instant TV tuner 76 which is connected to the EC/KBC 78 and operated based on the original OS regardless the OS 82 of PC is provided in dependent of the TV tuner 74 which is connected to the system controller 54 of the PC and operated under the control of the OS 82 of the PC. Some of the modules of the instant TV tuner 76, i.e., at least the demodulator/decoder module 112 is started up before the TV power source is supplied. Accordingly, the TV broadcasting signal is demodulated and decoded. However, a decoded video signal is not displayed. In the state, the operation of the TV power source button 34 is waited. When it is detected that the TV power source button 34 has been pressed, a video signal of TV broadcasting is output to the LCD panel 20. In this way, when the power source has been turned on, the LCD panel 20 begins to instantly display the video. Since the function of the instant TV tuner 76 is smaller than that of the TV tuner 74, even if the instant TV tuner 76 is operated before the TV power source is supplied, the waiting power is smaller than that of the TV tuner 74.

Moreover, since the user can select whether or not the instant TV tuner 76 is started up before the TV power source is supplied, a prompt startup that satisfies the needs of the user or power saving can be realized.

Note that even when the PC power source is supplied first and the TV power source button 34 is pressed while the PC function (PC application) is operated, the instant TV tuner 76 may be started up in place of the TV tuner 74 as shown in the flowchart explained in FIG. 7. However, the OS has been started up, even if the Instant TV tuner 76 and the TV application program 83 are started up, a considerable time is not necessary. For this reason, the Instant TV tuner 76 and the TV application program 83 may be started up in place of the instant TV tuner 76. The setting may be optionally selected from a menu by the user.

Other embodiments will be explained below.

In first embodiment, although the electronic device provided with the display main body 10 has been explained, a display unit may be disposed externally of the electronic device. That is, the electronic device may be provided only with a video signal output terminal without being provided with the LCD panel. Then, when the electronic device is connected to the commercial power source, the electronic device may be placed in a state that it can output a video signal (actually, it does not output the video signal), and when the electronic device detects that the TV power source has been turned on, it may output the video signal and display an image on the display unit.

In the first embodiment, when the electronic device is connected to the commercial power source, although the electronic device is placed in a state that it can output a video signal, it does not actually output the video signal. However, the invention is not limited thereto, and although the electronic device may output the video signal, a display of the LCD panel may be turned off.

In the first embodiment, although it has been explained that the instant TV tuner 76 is not provided with the program recording function and the EPG function, it may be provided with them. That is, the TV tuner 74 and the instant TV tuner 76 may have the same functions.

In first embodiment, when the display main body 10 is connected to the commercial power source via the AC adaptor and the power source cord, the instant TV tuner 76 is started up at all times. However, the instant TV tuner 76 may be turned on/off by providing the remote controller 14 with a quick start on/off button and operating the remote controller 14 by the user. For example, it is possible not to consume useless waiting power by turning off the instant TV tuner 76 while sleeping and while away from home. Further, it is possible to automatically turn off the instant TV tuner 76 in a time zone in which it is predicted that the user is slept or away from home and to automatically turn on the instant TV tuner 76 in a time zone other than the above time zone making use of a timer.

In the first embodiment, when the display main body 10 is connected to the commercial power source via the AC adaptor and the power source cord, although at least the demodulator/decoder module 112 of the instant TV tuner 76 is started up at all times, only the OS may be started up and the modules including the demodulator/decoder module 112 may be started up after the TV power source button 34 has been pressed.

In the first embodiment, although the instant TV tuner 76 is provided in addition to the TV tuner 74, only the TV tuner 74 may be provided without providing the instant TV tuner 76. Even if, for example, the OS 82 is started up at all times when the display main body 10 has been connected to the commercial power source via the AC adaptor and the power source cord and the TV application program 83 is started up when the TV power source button 34 has been turned on, The startup time can be reduced.

Although the first embodiment has explained the built-in desktop type PC, the embodiment is not limited thereto and can be applied to any electronic device as long as it has an image module operated by an OS.

Since processing of the embodiment can be realized by a computer program, the same effect as that of the embodiment can be easily realized only by installing the computer program on a computer via a computer-readable storage medium in which the computer program is stored and executing the computer program.

The invention is not limited to the embodiment as it is and can be materialized by modifying components within a scope which does not depart from the gist thereof in an embodying stage. Further, various inventions can be formed by appropriately combining the plural components disclosed in the embodiment. For example, some components may be deleted from all the components shown in the embodiment. Further, components employed in different embodiments may be appropriately combined.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device connectable to a display, the electronic device comprising:
    first and second television receivers to receive television broadcasting and to output a video signal, the first television receiver having a recording function, and the second television receiver not having the recording function, wherein
    an operation mode can be selectively set,
    the electronic device starts up a part of the second television receiver when a first operation mode is set and the electronic device is connected to a commercial power source, the part excluding a video output function, and
    the electronic device starts the video output function of the second television receiver to output the video signal from the second television receiver to the display when it is detected that a power switch is turned on after the part of the second television receiver is started.

2. The electronic device of claim 1, wherein
    the electronic device does not start up the second television receiver when the first operation mode is not selected, even if the electronic device is connected to the commercial power source; and
    the electronic device starts up the first television receiver when it is detected that the power switch is turned on when the first operation mode is not selected.

3. The electronic device of claim 1, further comprising a menu display to display a menu screen comprising a selectable operation mode.

4. The electronic device of claim 1, wherein
the at least a part of the second television receiver which is started up when the electronic device is connected to the commercial power source comprises an OS of the second television receiver.

5. The electronic device of claim 1, wherein
the at least a part of the second television receiver which is started up when the television receiver is connected to the commercial power source comprises an OS and a decoder of the second television receiver; and
an output of the video signal from the decoder to the display is temporarily stopped until it is detected that the power switch is turned on.

6. The electronic device of claim 5, wherein
the decoder is operated with a first consumption power when the electronic device is connected to the commercial power source; and
the decoder is operated with a second consumption power when it is detected that the power switch is turned on, the second consumption power being larger than the first consumption power.

7. The electronic device of claim 6, wherein
the decoder is operated with a first image quality when the electronic device is connected to the commercial power source; and
the decoder is operated with a second image quality when it is detected that the power switch is turned on, the second image quality being higher than the first image quality.

8. A display method of electronic device comprising first and second television receivers capable of being connected to a display, receiving television broadcasting, and outputting a video signal, the first television receiver having a recording function, and the second television receiver not having the recording function, the method comprising:
detecting when a user selectively sets an operation mode;
starting up a part of the second television receiver when a first operation mode is set and the electronic device is connected to a commercial power source, the part excluding a video output function, and
starting the video output function of the second television receiver to output the video signal from the second television receiver to the display when it is detected that a power switch is turned on after the part of the second television receiver is started.

9. The display method of claim 8, wherein
the second television receiver does not start up when the first operation mode is not selected, even if the electronic device is connected to the commercial power source; and
the first television receiver starts up when it is detected that the power switch is turned on when the first operation mode is not selected.

10. The display method of claim 8, further comprising displaying a menu to display a menu screen comprising a selectable operation mode.

11. The display method of claim 8, wherein
the at least a part of the second television receiver which is started up when the electronic device is connected to the commercial power source comprises an OS of the second television receiver.

12. The display method of claim 8, wherein
the at least a part of the second television receiver which is started up when the television receiver is connected to the commercial power source comprises an OS and a decoder of the second television receiver; and
an output of the video signal from the decoder to the display is temporarily stopped until it is detected that the power switch is turned on.

13. The display method of claim 12, wherein
the decoder is operated with a first consumption power when the electronic device is connected to the commercial power source; and
the decoder is operated with a second consumption power when it is detected that the power switch is turned on, the second consumption power being larger than the first consumption power.

14. The display method of claim 13, wherein
the decoder is operated with a first image quality when the electronic device is connected to the commercial power source; and
the decoder is operated with a second image quality when it is detected that the power switch is turned on, the second image quality being higher than the first image quality.

15. A non-transitory computer-readable storage medium having stored thereon a computer program which is executable by a computer comprising first and second television receivers capable of being connected to a display, receiving television broadcasting, and outputting a video signal, the first television receiver having a recording function, and the second television receiver not having the recording function, the computer program comprising instructions capable of causing the computer to execute functions of:
detecting when a user selectively sets an operation mode;
starting up a part of the second television receiver when a first operation mode is set and the electronic device is connected to a commercial power source, the part excluding a video output function, and
starting the video output function of the second television receiver to output the video signal from the second television receiver to the display when it is detected that a power switch is turned on after the part of the second television receiver is started.

16. The storage medium of claim 15, wherein
the second television receiver does not start up when the first operation mode is not selected, even if the electronic device is connected to the commercial power source; and
the first television receiver starts up when it is detected that the power switch is turned on when the first operation mode is not selected.

17. The storage medium of claim 15, further comprising displaying a menu to display a menu screen comprising a selectable operation mode.

18. The storage medium of claim 15, wherein
the at least a part of the second television receiver which is started up when the electronic device is connected to the commercial power source comprises an OS of the second television receiver.

19. The storage medium of claim 15, wherein
the at least a part of the second television receiver which is started up when the television receiver is connected to the commercial power source comprises an OS and a decoder of the second television receiver; and
an output of the video signal from the decoder to the display is temporarily stopped until it is detected that the power switch is turned on.

* * * * *